(12) United States Patent
Bitzer

(10) Patent No.: US 8,400,031 B2
(45) Date of Patent: Mar. 19, 2013

(54) ELECTRICAL CONNECTION FOR AN ELECTRIC MOTOR

(75) Inventor: Harold Bitzer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 12/921,855

(22) PCT Filed: Nov. 18, 2008

(86) PCT No.: PCT/EP2008/065704
§ 371 (c)(1),
(2), (4) Date: Sep. 10, 2010

(87) PCT Pub. No.: WO2009/112097
PCT Pub. Date: Sep. 17, 2009

(65) Prior Publication Data
US 2011/0012451 A1   Jan. 20, 2011

(30) Foreign Application Priority Data
Mar. 11, 2008   (DE) .................. 10 2008 000 598

(51) Int. Cl.
*H02K 11/00* (2006.01)
*H02K 5/12* (2006.01)
*H02K 15/12* (2006.01)
*H02K 1/04* (2006.01)

(52) U.S. Cl. ............... 310/71; 310/88; 310/87; 310/43; 310/44; 439/271; 439/275; 439/279; 174/50.59; 174/152 G; 174/153 G

(58) Field of Classification Search .............. 310/71, 310/88, 43, 44; 439/271, 275, 279; 174/50.59, 174/152 G, 153 G; H02K 11/00
See application file for complete search history.

(56) References Cited

U.S. PATENT DOCUMENTS

| 4,104,550 | A | * | 8/1978 | Penhorwood .................. 310/71 |
| 4,252,394 | A | * | 2/1981 | Miller ........................... 439/566 |
| 4,291,455 | A | * | 9/1981 | Schnyder ....................... 29/596 |
| 4,451,750 | A | * | 5/1984 | Heuer et al. .................... 310/88 |
| 4,523,117 | A | * | 6/1985 | Daniels .......................... 310/71 |
| 4,656,378 | A | * | 4/1987 | Atherton et al. ............... 310/71 |

(Continued)

FOREIGN PATENT DOCUMENTS

| DE | 19859183 A1 | 6/1999 |
| EP | 1870599 A1 | 12/2007 |

*Primary Examiner* — John K Kim
*Assistant Examiner* — Daniel Haile
(74) *Attorney, Agent, or Firm* — Michael Best & Friedrich LLP

(57) ABSTRACT

The invention provides an electrical connection for an electric motor having a casing which houses a drive device, embodied especially a stator in a casing interior. The drive device is contacted via a conductor, embodied especially in the form of a pin. The conductor is guided from the exterior into the interior of the casing via a casing opening. A cylindrical sealing element is provided on the casing opening in the casing interior to seal the conductor from the casing opening. The sealing element is provided with a continuous collar and a through-opening through which the conductor extends and in which the conductor is sealed in the through-opening via at least one radial sealing lip that is formed in the through-opening on the sealing element and that rests on a surface of the conductor. The conductor is then sealed towards the housing via at least one axial sealing lip that is formed on the collar and that rests on an inside of the casing. The electrical connection according to the invention can be used for a motor, especially for driving a motor cooling fan.

23 Claims, 2 Drawing Sheets

U.S. PATENT DOCUMENTS

| | | | |
|---|---|---|---|
| 4,961,018 A * | 10/1990 | Akhter | 310/87 |
| 5,095,612 A * | 3/1992 | McAvena | 29/596 |
| 5,661,352 A * | 8/1997 | Oguchi et al. | 310/71 |
| 5,949,167 A * | 9/1999 | Blalock et al. | 310/71 |
| 6,429,557 B2 * | 8/2002 | Sheeran et al. | 310/71 |
| 6,548,924 B2 * | 4/2003 | Furukawa et al. | 310/68 C |
| 6,608,414 B1 * | 8/2003 | Conley | 310/89 |
| 6,664,678 B2 * | 12/2003 | Shimizu | 310/71 |
| 7,535,163 B2 * | 5/2009 | Hsu et al. | 313/504 |
| 2007/0001529 A1 * | 1/2007 | Takahashi et al. | 310/88 |
| 2007/0218736 A1 | 9/2007 | Takizawa et al. | |
| 2008/0138226 A1 | 6/2008 | Koitabashi et al. | |

* cited by examiner

… … …

ELECTRICAL CONNECTION FOR AN ELECTRIC MOTOR

CROSS-REFERENCE TO RELATED APPLICATION

This application is a 35 USC 371 application of PCT/EP2008/065704 filed on Nov. 18, 2008.

BACKGROUND OF THE INVENTION

1. Field of the Invention

The present invention relates to an electrical connection for an electric motor.

2. Description of the Prior Art

In electrical connections, it is generally known to provide so-called single-wire seals (German abbreviation: EADs) to seal cables in plugs. The individual electrical conductors in them are routed through a through opening provided in the sealing element. The sealing element usually has at least one radial sealing lip that rests against a surface of the conductor inside the through opening in order to produce a seal. Additional radial sealing lips provided on the outside of the sealing element then produce a seal in relation to a housing containing the sealing element and electrical conductors. The housing accommodating the sealing element then tapers in a funnel shaped so that only the electrical conductor, sealed in the smaller-diameter funnel-shaped section, is routed further to the plug.

The sealing element consequently functions on the one hand radially in relation to the electrical conductor and on the other hand, radially in relation to the housing. This is known as a "radial-radial"-acting seal. The disadvantage to this kind of seal for an electrical connection is the relatively high complexity, both of the housing that accommodates the sealing element and of the funnel embodiment. Usually, the housing and funnel require cost-intensive finishing work.

ADVANTAGES AND SUMMARY OF THE INVENTION

The electrical connection for an electric motor according to the invention has the advantage over the prior art that an electrical connection for an electric motor that is sealed in relation to the housing is produced, which is reliable on the one hand and relatively inexpensive to manufacture on the other. The electrical conductor, particularly in the form of a pin, is routed from the outside through a housing opening into the interior of the housing and a reliable seal is produced between a sealed control unit side and an open motor housing. A cost-intensive mechanical finishing previously required for the routing and sealing of the electrical conductor in a funnel-shaped part can be advantageously eliminated, which increases economy.

A simple construction and favorable prestressing of the sealing element is achieved if the sealing element is accommodated in a separate sleeve that is mounted in a prestressed fashion in the housing. In this case, the prestressing is advantageously exerted by means of screws that are provided for screw-mounting the stator to the housing of the electric motor. It has turned out to be advantageous to use self-tapping screws for these screws.

An optimum mounting location is one in which the sleeve is mounted between the stator and the housing of the electric motor.

A good seal of the sealing element in the sealing housing is produced if the sealing element has additional outer radial sealing lips, which are situated opposite from the inner radial sealing lips and rest against the sleeve in a receiving opening.

The sealing function is further improved if the sealing element has inner axial sealing lips, which are situated opposite from the outer axial sealing lips and are provided for the collar in a receiving opening of the sleeve.

BRIEF DESCRIPTION OF THE DRAWINGS

An exemplary embodiment of the invention will be explained in greater detail in the following description in conjunction with the drawings, in which.

DESCRIPTION OF THE PREFERRED EMBODIMENT

Figure 1:
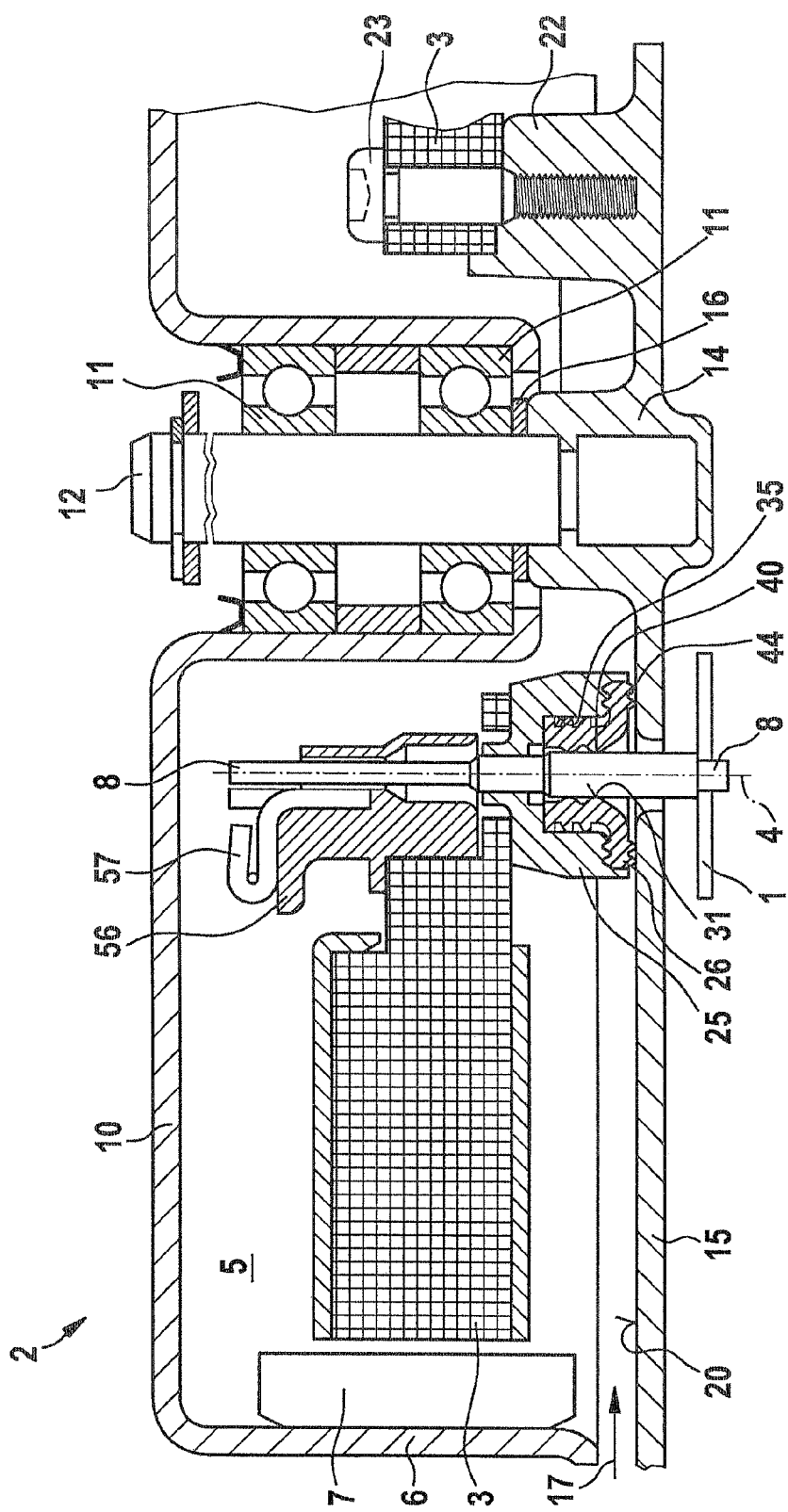
FIG. 1 shows an exemplary embodiment of an electrical connection for an electric motors.

FIG. 1 shows an exemplary embodiment according to the invention of an electrical connection 1 for an electric motor 2. The connection 1 achieves a contacting of a drive unit of the electric motor 2. In the exemplary embodiment, the drive unit is a stator 3. For example, the electric motor 2 is embodied in the form of a so-called external rotor motor in which the stationary part, in this case the stator 3 of the electric motor 2, is situated in a motor housing interior 5 and is encompassed by a moving part, a rotor 6. This design is particularly suitable for axial fans, e.g. of the kind used in motor cooling fans. In the electronically commutated DC external rotor motor 2 shown here, the rotor 6 is equipped with permanent magnets 7 arranged in a ring. The stationary stator 3 has a conventional design with sheet metal stacks and is electrically contacted via an electric conductor which is embodied here in the form of a round pin 8. For example, the pin 8 is composed of a copper alloy and is preferably manufactured by means of impact extrusion. A radial gap in the motor housing interior 5 is provided between the permanent magnets 7 and the stator 3.

The rotor 6 encompassing the stator 3 has a cup-shaped rotor housing 10. The rotor housing 10 is supported on a shaft 12 by means of bearing elements 11 and is able to rotate around the shaft 12. Between the rotor housing 10 and a motor housing (base plate) 15, there is an axial gap in which, as indicated by an arrow 17, air can flow into the motor housing interior 5 for ventilation. The shaft 12 is cast into a sleeve-shaped shaft receptacle 14 of the motor housing 15, for example in the form of an aluminum die-cast connection. The bearing elements 11, which are embodied for example as ball bearings, rest against the shaft receptacle 14 by means of a washer 16.

The stator 3 is accommodated in the motor housing interior 5 and is fastened to the motor housing 15 at fastening points 22 that are embodied in the form of lugs that are raised in relation to an inside 20 of the motor housing 15. To connect to the stator 3 to the motor housing 15 a plurality of screws 23, for example, is provided, which screw-mount the stator 3 or stator stack to the fastening points 22, thus pressing it into the fastening points 22. One of the fastening points 22 can be composed of a sealing sleeve 25 in which a sleeve-shaped or hollow-cylindrical sealing element 26 is accommodated. The sealing sleeve 25 is mounted in a prestressed fashion between the stator 3 and the motor housing 15. Preferably, three screws 23 are used for this purpose, which are in particular embodied in the form of self-tapping screws or thread-forming screws. Opposite from the stator 3 on another side of the motor housing 15, referred to below as the control unit side 28 shown in FIG. 2, a control unit, not shown in detail, is provided for the electric motor 2. An electrical connection to components, not shown in detail, of the electrical or electronic control unit is produced via the electrical conductors or pins 8, for example four pins, with two pins for control signals and two pins for the power supply.

Figure 2:
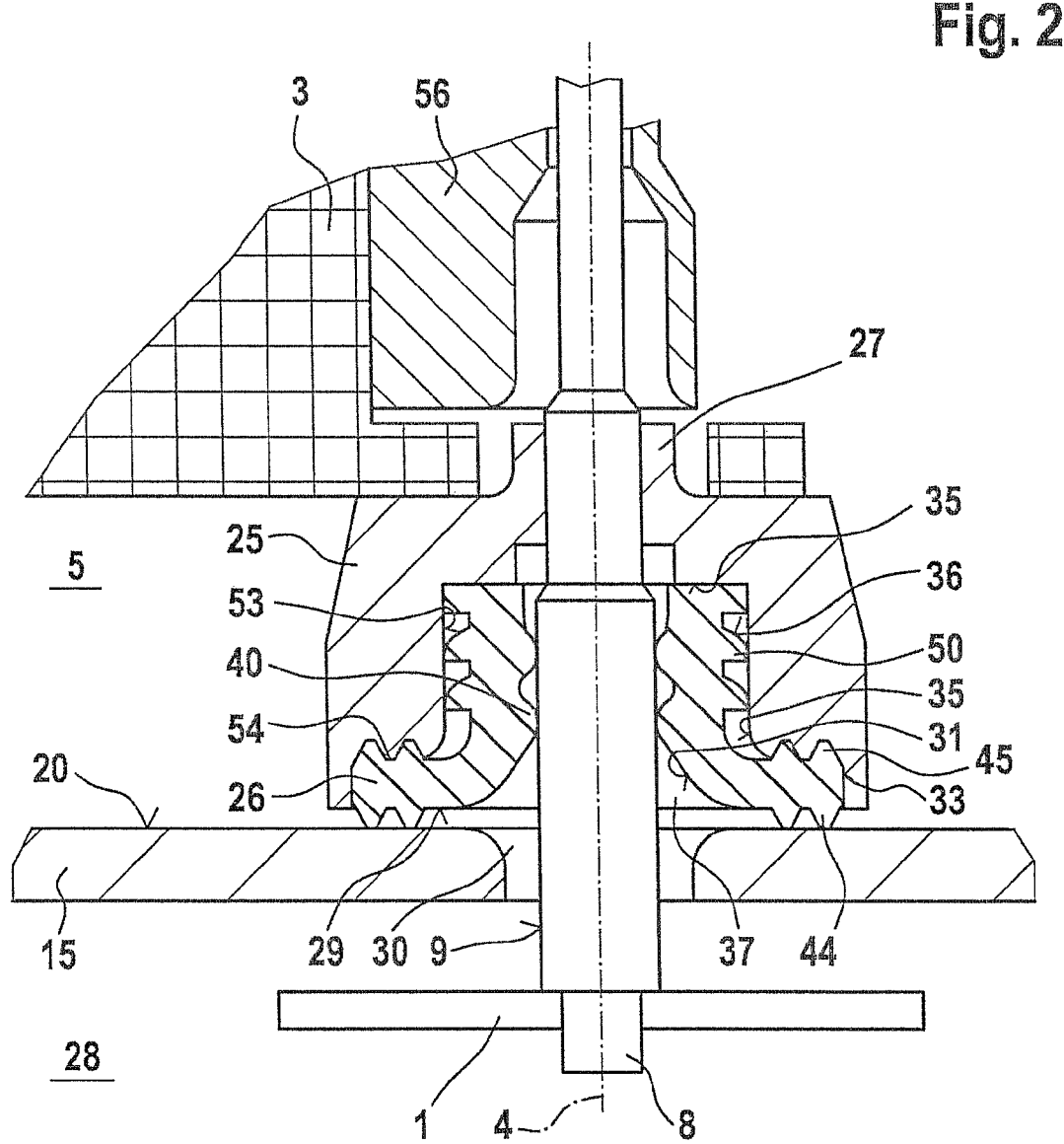
FIG. 2 shows an enlarged detail of the electrical connection from FIG. 1.

As shown in greater detail in FIG. 2, the electrical conductor or pin 8 is routed from the outside or from the control unit side 28 through a housing opening 30 into the motor housing interior 5. In so doing, the pin 8 is inserted through a through opening 31 provided in the sealing element 26. As this occurs, the sealing sleeve 25 is centered on the motor contact or pin 8, resulting in a uniform circumferential pressure of inner radial sealing lips 40 against the pin 8. In the through opening 31 of the sealing element 26, the pin 8 is radially sealed in the through opening 31 by means of the at least one inner radial sealing lip 40, which is embodied on the sealing element 26 in the through opening 31 and rests against a circumferential surface 9 of the pin 8. As shown, it is possible, for example, to provide two circumferential radial sealing lips 40 that are spaced axially apart from each other with respect to a longitudinal axis 4 of the pin 8.

To seal the pin 8 in relation to the housing opening 30, the sealing element 26 also has a circumferential collar 33 whose outer diameter is greater than the housing opening 30 and therefore overlaps it. At least one outer axial sealing lip 44 provided on the collar 33 and pressed against the inside 20 of the motor housing 15 produces an axial seal of the outside or control unit side 28 in relation to the motor housing interior 5. Usually, the control unit side 28 is closed in a sealed fashion by contrast with the motor side or ventilated motor housing interior 5. As shown, it is possible, for example, to provide two outer axial sealing lips 44 that extend concentrically with different radii and the same center point in a fashion similar to the rings of a target. To produce a definite axial pressing of the axial sealing lips 44, the sealing sleeve 25 is clamped between the stator 3 and the motor housing 15. In this case, the prestressing is provided by screw-mounting the stator 3 by means of three self-tapping screws 23.

Adjacent to the collar 33, the sealing element 26 has a longitudinal body, resulting in a T shape of the sealing element 26 in cross section. The sealing element 26 is almost completely accommodated in a correspondingly stepped receiving opening 35 of the sealing sleeve 25 so that only the axial sealing lips 44 protrude from an annular end surface 29 of the sealing sleeve 25. To produce a seal in the receiving opening 35 of the sealing sleeve 25, the sealing element 26 has at least one outer radial sealing lip 50 on its outer circumference surface 36. In the exemplary embodiment, two outer radial sealing lips 50 are provided that rest in a sealed fashion against an inner surface 53 of the receiving opening 35 of the sealing sleeve 25. In the axial direction opposite from the outer axial sealing lips 44, inner axial sealing lips 45 are also provided, which rest in a sealed fashion against an annular surface 54 in the receiving opening 35 of the sealing sleeve 25 in the clamped or mounted state of the sealing sleeve 25.

The housing opening 30 of the motor housing 15 preferably has an opening cross section of slightly larger dimensions than an opening cross section of the through opening 31 of the sealing element 26. As shown, the through opening 31 of the sealing element 26 tapers in funnel-shaped fashion toward the inside. The outer axial sealing lips 44 and the inner radial sealing lips 40 constitute a sealing region 37 oriented toward the housing opening 30 and the control unit side 28. The outer axial sealing lips 44 and inner radial sealing lips 40 produce a reliable seal against the pin 8 between the motor housing interior 5 and the control unit side 28. Naturally, it is possible to provide a greater or lesser number of axial sealing lips 44 and radial sealing lips 40 than shown in FIGS. 1 and 2. The sealing function in relation to the pin 8 occurs on the one hand in the radial direction by means of the inner radial sealing lips 40, which are pressed in a radially circumferential fashion against the surface 9 of the pin 8 and therefore produce the sealing action. On the other hand, the sealing element 26 itself rests with its outer radial sealing lips 50 against the inner surface 53 of the receiving opening 35 of the sealing sleeve 25 in order to produce the required sealing pressure.

For the sealing function in relation to the motor housing 15, the outer axial sealing lips 44, which are provided on the sealing element 26 and situated coaxial to the housing opening 30 of the motor housing 15 and coaxial to the longitudinal axis 4 of the pin 8, are pressed against the inside 20 of the motor housing 15 and therefore the axial sealing action is produced by means of the resulting sealing pressure. The axial force for pressing the axial sealing lips 44 is therefore exerted by means of the sealing sleeve 25, which is mounted in a prestressed fashion between the stator 3 and the motor housing 15. As is particularly shown in FIG. 2, the stator 3 presses against the sealing sleeve 25 and therefore holds it in a prestressed fashion.

The pin 8 is embodied with a uniform cross section in the through opening 31 of the sealing element 26. The cross section of the pin 8 decreases after the sealing element 26 in the axial direction until it emerges from the sealing sleeve 25 to a sleeve-shaped collar end 27 of the sealing sleeve 25. Outside the sealing sleeve 25, there is a further cross-sectional reduction of the pin 8, whose span then continues in a funnel-shaped stator connection receptacle 56 and passes through the latter. As shown in FIG. 1, an electrical contact with a stator connection conductor 57, which is bent into a hook shape, and therefore with the stator 3 is produced inside the stator connection receptacle 56, approximately at the end of the pin 8. Since it is no longer necessary to seal the stator connection receptacle 56, this significantly simplifies the manufacture of the funnel-shaped stator connection receptacle 56. The receiving opening 35 of the sealing sleeve 25 is embodied with three steps, with the sealing element 26 accommodated in the two larger-diameter steps and the pin 8 is directly guided in the receiving opening 35 in the smaller-diameter step.

For example, the motor housing 15 is made out of aluminum. The sealing element 26 with the sealing lips 40, 44, 45, and 50 is embodied as elastically deformable. For example, it can be a silicone seal or the like. For example, the sealing sleeve 25 can be made of plastic.

The foregoing relates to the preferred exemplary embodiment of the invention, it being understood that other variants and embodiments thereof are possible within the spirit and scope of the invention, the latter being defined by the appended claims.

The invention claimed is:

1. An electrical connection for an electric motor having a motor housing with an interior in which a stator of the electric motor is accommodated, the electrical connection being connected to the stator via an electrical conductor in the form of a pin extending in an axial direction, that is routed from outside the housing into the housing interior via a housing opening, the electrical connection comprising a sleeve-shaped sealing element that is accommodated in a separate sealing sleeve which is mounted within the housing interior in a prestressed fashion between the stator and the housing of the electric motor, the sealing element being provided against an inner surface of the housing about the housing opening in order to seal the electrical conductor in relation to the housing opening, the sealing element having a circumferential collar with an outer diameter which is greater than the housing opening and overlaps the housing opening and a through opening through which the electric conductor extends, wherein at least one inner radial sealing lip which is situated on the sealing element in the through opening and which rests against a surface of the electric conductor seals the conductor in the through opening, and wherein at least one outer axial sealing lip which extends in the axial direction is embodied on the collar and rests against the inner surface of the housing to seal the sealing element in relation to the housing.

2. The electrical connection as recited in claim 1, wherein the prestressing of the sealing sleeve is exerted by screws that are provided for screw-mounting the stator to the housing of the electric motor.

3. The electrical connection as recited in claim 2, wherein the screws are self-tapping screws.

4. The electrical connection as recited in claim 1, wherein the sealing element has at least one outer radial sealing lip which is situated opposite from the at least one inner radial sealing lip and which rests in a sealed fashion in a receiving opening of the sealing sleeve.

5. The electrical connection as recited in claim 2, wherein the sealing element has at least one outer radial sealing lip which is situated opposite from the at least one inner radial sealing lip and which rests in a sealed fashion in a receiving opening of the sealing sleeve.

6. The electrical connection as recited in claim 3, wherein the sealing element has at least one outer radial sealing lip which is situated opposite from the at least one inner radial sealing lip and which rests in a sealed fashion in a receiving opening of the sealing sleeve.

7. The electrical connection as recited in claim 1, wherein the sealing element has at least one inner axial sealing lip which extends in the axial direction and is situated opposite from the at least one outer axial sealing lip and is provided in a receiving opening of the sleeve for the collar.

8. The electrical connection as recited in claim 2, wherein the sealing element has at least one inner axial sealing lip which extends in the axial direction and is situated opposite from the at least one outer axial sealing lip and is provided in a receiving opening of the sleeve for the collar.

9. The electrical connection as recited in claim 3, wherein the sealing element has at least one inner axial sealing lip which extends in the axial direction and is situated opposite from the at least one outer axial sealing lip and is provided in a receiving opening of the sleeve for the collar.

10. The electrical connection as recited in claim 4, wherein the sealing element has at least one inner axial sealing lip which extends in the axial direction and is situated opposite from the at least one outer axial sealing lip and is provided in a receiving opening of the sleeve for the collar.

11. The electrical connection as recited in claim 6, wherein the sealing element has at least one inner axial sealing lip which extends in the axial direction and is situated opposite from the at least one outer axial sealing lip and is provided in a receiving opening of the sleeve for the collar.

12. The electrical connection as recited in claim 5, wherein the sealing element has at least one inner axial sealing lip which extends in the axial direction and is situated opposite from the at least one outer axial sealing lip and is provided in a receiving opening of the sleeve for the collar.

13. The electrical connection as recited in claim 1, wherein the at least one inner radial sealing lip comprises two circumferential radial sealing lips that are spaced axially apart from each other in the axial direction.

14. The electrical connection as recited in claim 1, wherein the at least one outer axial sealing lip comprises two axial concentric sealing lips with different radii that extend in the axial direction.

15. The electrical connection as recited in claim 1, wherein the sealing element is accommodated in a corresponding stepped receiving opening in the sealing sleeve so that only the at least one axial sealing lip protrudes from an annular end surface of the sealing sleeve.

16. The electrical connection as recited in claim 4, wherein the at least one outer radial sealing lip is on an outer circumferential surface of the sealing element and rests in a sealed fashion against an inner surface of the receiving opening in the sealing sleeve.

17. The electrical connection as recited in claim 4, wherein the at least one outer radial sealing lip comprises two circumferential outer radial sealing lips on an outer circumferential surface of the sealing element that are spaced axially apart from each other in the axial direction and rest in a sealed fashion against an inner surface of the receiving opening in the sealing sleeve.

18. The electrical connection as recited in claim 7, wherein the at least one inner axial sealing lip rests in a sealed fashion against an annular surface in the receiving opening of the sealing sleeve for the collar in a mounted state of the sealing sleeve.

19. The electrical connection as recited in claim 1, wherein the through opening of the sealing element tapers in a funnel-shaped fashion towards the inside.

20. The electrical connection as recited in claim 10, wherein the inner and outer radial sealing lips and the inner and outer axial sealing lips are embodied as elastically deformable.

21. The electrical connection as recited in claim 1, wherein the collar of the sealing element extends between an end of the sealing sleeve and the housing.

22. The electrical connection as recited in claim 1, wherein the inner radial sealing lip extends circumferentially around the sealing element.

23. The electrical connection as recited in claim 1, wherein the outer axial sealing lip extends in a ring-like manner around the housing opening.

* * * * *

UNITED STATES PATENT AND TRADEMARK OFFICE
CERTIFICATE OF CORRECTION

PATENT NO. : 8,400,031 B2
APPLICATION NO. : 12/921855
DATED : March 19, 2013
INVENTOR(S) : Harold Bitzer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 179 days.

Signed and Sealed this

First Day of September, 2015

Michelle K. Lee
*Director of the United States Patent and Trademark Office*